UNITED STATES PATENT OFFICE.

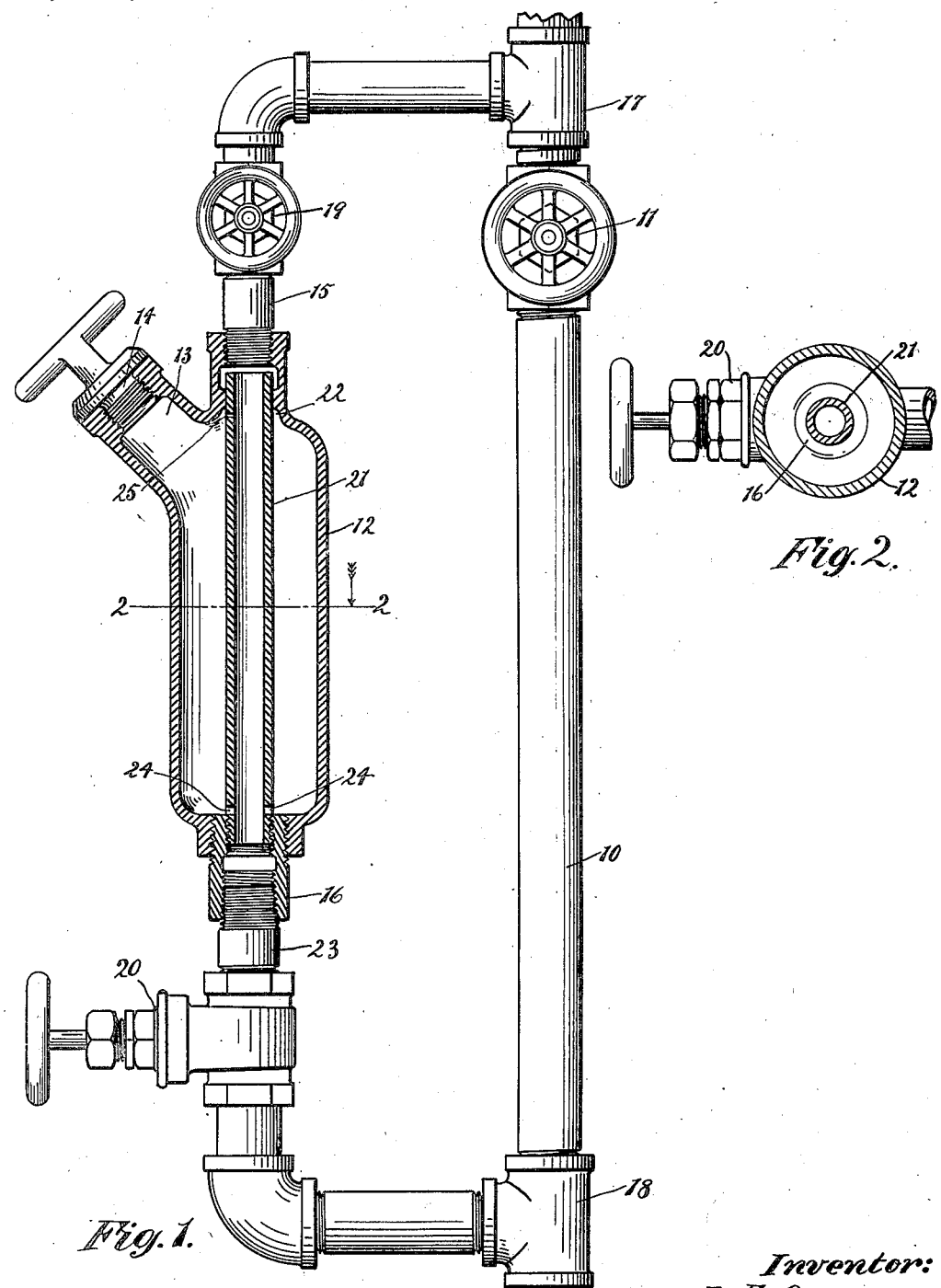

LONNIE EDWARD OSBORNE, OF PITTSBURGH, PENNSYLVANIA, ASSIGNOR TO LOCOMOTIVE STOKER COMPANY, A CORPORATION OF PENNSYLVANIA.

LUBRICATOR.

1,423,011. Specification of Letters Patent. Patented July 18, 1922.

Application filed March 4, 1920, Serial No. 363,322. Renewed May 31, 1922. Serial No. 565,015.

*To all whom it may concern:*

Be it known that I, LONNIE EDWARD OSBORNE, a citizen of the United States, and resident of Pittsburgh, county of Allegheny, and State of Pennsylvania, have invented certain new and useful Improvements in Lubricators, of which the following is a specification, and which are illustrated in the accompanying drawings, forming a part thereof.

The invention relates to lubricators for use in connection with engines and adapted to deliver lubricant to the cylinders thereof through a pressure fluid lead; its object being to provide a device of this kind which may preferably be intermittently used and which will automatically fill a section of the pressure pipe with a charge of lubricant when cut off from communication with the engine.

An embodiment of the invention is hereinafter described, and is illustrated in the accompanying drawings in connection with the supply pipe of a steam engine. In the drawings:

Fig. 1 is a longitudinal sectional view of the lubricator, the steam connections being shown in elevation; and Fig. 2 is a detail section on the line 2—2 of Fig. 1.

The main steam line to an engine is shown at 10, its upper end being adapted for connection with a source of steam supply and its lower end with the engine cylinder. A throttle valve of any desired form is placed within this lead, as represented at 11.

The container comprises a tank 12, having a filling opening 13, which may be closed in any desired manner, as by means of a screw plug 14. This container has top and bottom openings tapped to receive screw connections 15, 16, both of which are in communication with the steam line 10, as shown at 17, 18. The upper connection is preferably on the boiler side of the throttle valve 11.

Within each of these connections of the container with the steam line are placed cut-off valves 19, 20.

A tube 21, located upon the vertical axis of the container 12, fits within the top and bottom openings thereof. As shown, this fit is secured by threading the lower end of the pipe into the connection of the nipple 16, its upper end making a sliding fit with an apertured diaphragm 22 formed integral with the container. The connection 15 with the upper end of the container is shown as threaded directly into the upper opening of the latter, and the lower connection with the steam line 10 comprises a nipple 23 threaded into the nipple 16. The tube 21 has one or more ports, as 24, adjacent its lower end, constantly open to the chamber of the container 12, and near its upper end there is a vent port 25.

The container 12 being supplied with lubricant and the valves 19, 20, being closed, the tube 21 is filled through the ports 24 to the level of the contents of the container chamber. The valves 19, 20, being open the lubricant within the tube is carried into the main steam line and thence to the engine cylinder. If the valves 19, 20, remain open there will be a constant discharge of the lubricant, its flow into the tube 21 through the ports 24 being stimulated by the passage of steam. Preferably the lubricant is discharged into the cylinder intermittently, the valves 19, 20, or at least the latter, being closed as soon as the lubricant accumulated in the tube 21 shall have been carried forward. Upon the closure of the valve 20 the lubricant will flow into the tube 21, filling it to the level then existing in the chamber of the container. The vent 25 facilitates the refilling of the tube with lubricant by providing for an equalization of pressure therein and within the chamber of the container, this action being secured whether the valve 19 be closed or open.

While I have shown a preferred embodiment of the invention, various changes in the details of construction may be made without departing from its scope, as, for example, while the tube 21 which forms a section of the by-pass around the throttle valve 11 is preferably included within the container, this relationship is not essential, it being necessary only that the filling ports for the tube be connected with the lower portion of the container and a vent port be connected with the upper portion of the container.

I claim as my invention—

1. In a lubricator, in combination, a container having top and bottom openings, a tube within the container and fitted to such openings and having open lateral ports adjacent its lower and upper ends, and fluid pressure conveying ducts connected with both ends of the tube.

2. In a lubricator, in combination, a container having top and bottom openings, a tube within the container and fitted to such openings and having open lateral ports adjacent its lower and upper ends, and valve-controlled fluid pressure conveying ducts connected with both ends of the tube.

3. A lubricator comprising, in combination, a nipple screw threaded both interiorly and exteriorly at one end, a section of pipe engaged with said interior screw threads, a cylinder having restricted extremities provided with internal screw threads, one of said extremities engaged with the exterior threads of said nipple, the other extremity forming a sliding fit upon and extending beyond the free end of said pipe section, said section having ports opening into said cylinder adjacent each extremity.

L. EDWARD OSBORNE.